United States Patent [19]
Yoshimura et al.

[11] 3,898,539
[45] Aug. 5, 1975

[54] THIN-FILM SOLID ELECTROLYTIC CAPACITOR AND A METHOD OF MAKING THE SAME

[75] Inventors: Susumu Yoshimura; Yoshimasa Ito; Mutsuaki Murakami, all of Kawasaki, Japan

[73] Assignee: Matsushita Electric Industrial Co., Ltd., Kawasaki, Japan

[22] Filed: Mar. 16, 1973

[21] Appl. No.: 341,897

[30] Foreign Application Priority Data
Mar. 17, 1972 Japan.............................. 47-27767

[52] U.S. Cl.............................. 317/230; 117/200
[51] Int. Cl............................................. H01g 9/05
[58] Field of Search.................. 317/230; 252/62.2; 117/200, 217, 218

[56] References Cited
UNITED STATES PATENTS 3,214,648  10/1965  Ross et al. .......................... 317/230
3,397,446  8/1968  Sharp............................. 317/230 X
3,483,438  12/1969  Sharbaugh ........................ 317/230
3,619,387  11/1971  Mindt et al. .................... 317/230 X
3,679,944  7/1972  Yoshimura et al. ................ 317/230

Primary Examiner—William D. Larkins

[57] ABSTRACT

A method of evaporating a thin film of TCNQ salt on an oxide dielectric film to produce a thin-film capacitor is disclosed. A source material composed of a TCNQ salt is heated to a predetermined source temperature at a rate of at least 4°C per second. A TCNQ salt is evaporated at the predetermined temperature being controlled within a variation of ±2°C. An inactive metal is evaporated onto the TCNQ salt film to prevent it from oxidizing the inner surface of the cathode material.

6 Claims, 3 Drawing Figures

3,898,539

THIN-FILM SOLID ELECTROLYTIC CAPACITOR AND A METHOD OF MAKING THE SAME

This invention relates to a solid thin-film electrolyte capacitor and a method of making the same, and more particularly to a method of producing a solid electrolyte thin-film capacitor having an organic semiconductor.

Solid electrolyte capacitors that are presently known to the art have an anode of a film-forming metal (valve-metal), usually aluminium or tantalum. The exposed surfaces of the anode are provided with an oxide coating which serves as the active dielectric of the capacitor. A layer of a solid electrolyte is produced in contact with the dielectric, and is usually manganese dioxide for tantalum. The production of the solid electrolyte layer involves high temperatures, for example, the pyrolytic decomposition of manganese nitrate to manganese dioxide is conducted at a temperature in the range of 200° to 400°C. In order to ensure that the oxide coated surfaces of the anode are completely coated with the solid electrolyte, it is necessary to repeat the pyrolytic decomposition several times. The exposure to the high temperatures involved in producing the solid electrolyte layer are disadvantageous because of the likelihood of injury to the easily damaged oxide film.

One approach for overcoming the difficulties of making these capacitors is disclosed in U.S. Pat. Nos. 3,214,648 and 3,214,650. These patents disclose the formation of an organic charge-transfer complex in situ on the dielectric oxide film to produce a solid electrolyte. By this means, a conventional capacitor having a dielectric oxide coating on the exposed metal surfaces, is impregnated with a solution of one of these complexes. Evaporation of the solvent, leaves a deposit of crystals of charge-transfer complex on the surface of the dielectric oxide coating.

U.S. Pat. No. 3,483,438 discloses a solid electrolytic capacitor employing an organic semiconductor electrolyte which has been discovered by J. H. Lupinski as disclosed in U.S. Pat. No. 3,424,698. In U.S. Pat. No. 3,483,438 a saturated solution of the complex quinoline salt of 7,7,8,8-tetracyanoquinodimethan in dimethylformamide is spread over the surface of an anodized aluminium foil. For brevity, 7,7,8,8-tetracyanoquinodimethan will hereinafter be called TCNQ. However, in order to ensure that the oxide film is uniformly coated with the solution, this solution is diluted and sprayed on the anodized aluminum electrode using a series of repeated sprayings.

Another method which has been proposed heretofore for employing an organic electrolyte in a thin-film capacitor involves separately preparing TCNQ and a donor substance for a TCNQ complex salt, placing them on separate evaporation sources, evaporating them to form alternate layers of deposits onto a substrate and applying water vapor or heat to the substrate to form an EDA compound. Although this method permits production of an organic thin film, the process would become complicated and troublesome operations would accompany. Particularly, an extremely complicated process would be required if it is desired to deposit triethylamine, quinoline and pyridine which are normally in a liquid state. In addition, it would be difficult to assure that a complete EDA has been formed when the film thickness exceeds a certain limit, since the deposits are alternate layers of donor and acceptor molecules.

It is accordingly an object of the present invention to provide a method of evaporating TCNQ-containing organic semiconductors on the anodized electrode of a thin-film electrolytic capacitor.

Another object of the present invention is to provide a method of uniformly coating the TCNQ-containing semiconductors in a single phase to produce a thin-film capacitor which can be used to voltages higher than the prior art.

Still another object of the present invention is to provide a thin-film electrolytic capacitor having an increased capacitance value per unit area.

Our invention will be better understood from the following description taken in conjunction with the accompanying drawings, in which.

Figure 1:
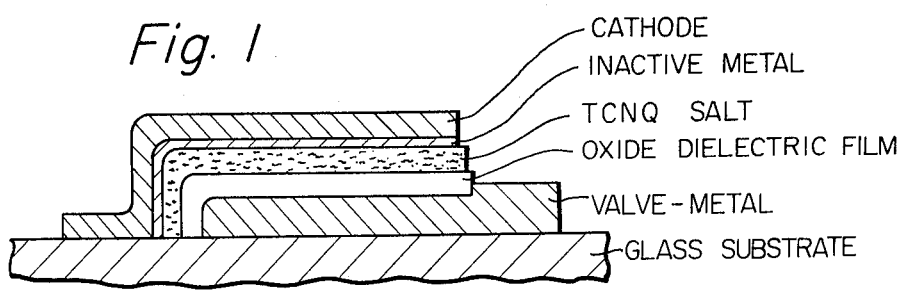
FIG. 1 is a cross-sectional view of a thin-film solid electrolytic capacitor constructed in accordance with the present invention.

The first feature of the present invention is evaporation of organic semiconductors based on the discovery that when a TCNQ-containing organic compound is heated in a vacuum chamber to a predetermined temperature at a rate higher than 4°C per second, the complex TCNQ salt is vaporized and deposited on the dielectric film of a film-forming metal (valve-metal), and that when the compound is heated to the same temperature at a rate lower than that referred to above the TCNQ of the compound is vaporized. At this lower rate certain organic semiconductors exhibit properties of evaporating both TCNQ and complex TCNQ salt simultaneously. However, these can be separated from each other by heating the source material of the compound at a rate higher than 4°C per second. In addition, since decomposition occurs at a temperature slightly above the evaporation temperature, precise control should be provided to maintain the temperature at a desired level.

The second feature of the present invention is that, since the organic semiconductor film has strong oxidizing properties which adversely affect the surface of the adjacent cathode, a film of inactive metal such as gold or silver is vapor deposited on the organic semiconductor film to prevent such oxidization.

In addition, the conventional thin-film capacitors cannot be used to relatively high voltages, the capacitance value is limited to 1000 pF/mm$^2$ for aluminum anode and 3500 pF/mm$^2$ for tantalum anode. Therefore, the third feature of the invention is directed to a method of increasing the capacitance values by corroding the surface of the valve-metal in a solution containing hydrochloric acid to increase its surface area and then pre-anodizing it in a solution containing oxalic acid or sulfuric acid or the mixture thereof. A thin film capacitor with capacitance of up to 7500 pF/mm$^2$ can be obtained.

Prior to the description of a method of evaporating organic semiconductors on an oxidized dielectric film, a general description will be given to TCNQ-containing organic semiconductors.

It has been pointed out by L. R. Melby et al in J. Am. Chem. Soc. Vol. 84 page 3374 (1962) that TCNQ has no fixed melting point on account of its strong charge-transfer properties. For this reason it has been considered impossible to achieve direct vapor deposition of an organic semiconductor on an oxide dielectric film. The TCNQ is composed of molecules of a planar structure bound by a strong charge-transfer force as described above and when in contact with other molecules, the TCNQ forms a new bond by accepting electrons from the other molecules. This electrophilic action will be more pronounced if the other molecules have greater electron-releasing properties. Therefore, the TCNQ may undergo ionization of varied degrees depending on the amount of electrons released by the opponent molecules (which is determined by the ionization potential), and the compositions which exhibit such properties are generally called Electron Donor Acceptor (EDA). These compositions have been treated as an electron conducting element and little attention has been given to its properties of ionic conductivity. There are certain compounds which exhibit the properties of prominent ionic conduction as well as anodic oxidization. Donor molecules suitable for producing an ionic bonding with the TCNQ have preferably a lower ionization potential and these include such compounds as aromatic diamine, substituted ammonium, aromatic onium and metallic cation-containing compounds. Ionic bonding between the TCNQ and aromatic diamine, for example, p-phenylenediamine is relatively weak, while ionic bonding between the TCNQ and ammonium ions produces such a compound of complete ionization as $NH_4^+TCNQ^-$ which is a simple salt of TCNQ. On the other hand, the complex salt of TCNQ containing a free TCNQ includes triethylammonium$^+$(TCNQ)$_2^-$ and pyridinium$^+$(TCNQ)$_2^-$. Because of their relatively high electrical conductivities, these complex salts are considered suitable for applications to electrolytic capacitors.

In order to determine the possibility of the direct vapor deposition of a TCNQ salt onto the oxide dielectric film of a valve-metal, various TCNQ-containing compositions were prepared in the form of a pellet. The pellet was heated in a vacuum chamber at different rates of increase in temperature and the following results were obtained:

1. Although certain compounds of TCNQ simple salts containing metallic cations such as $Na^+TCNQ^-$, $Cu^+TCNQ^-$, $Ba^{++}(TCNQ^-)_2$ released a free TCNQ at about 80°C, these simple salts did not exhibit the properties of evaporating EDA compounds. However, $Cu^{++}(TCNQ^-)_2$ released a TCNQ when heated to 90°C at a rate higher than 4°C per second and released $Cu^{++}(TCNQ^-)_2$ and $Cu^+TCNQ^-$ when heated to 240°C at a rate higher than 4°C per second.

2. Simultaneous evaporation of a TCNQ and EDA was observed when compositions having a relatively weak binding such as pendidine-TCNQ, P-phenylenediamine-TCNQ and diethyl-p-phenylenediamine were heated to a temperature in the range of 90° to 110°C at a rate lower than 4°C/sec. These deposits of TCNQ and EDA could also be separated from each other when the pellet was heated at a rate higher than 4°C/sec, since the TCNQ assumed a greater speed as it leaves from the pellet surface than the EDA deposit.

3. The simple salts of onium-TCNQ including ammonium$^+$TCNQ$^-$ behaved in a manner similar to that described in (2). However, evaporation of alkyl-substituted simple salts of quinoline-TCNQ or pyridine-TCNQ was impossible, since decomposition occurred at a temperature in the range of 150° to 200°C.

4. With regard to complex salts of alkyl-ammonium-TCNQ and aromatic onium-TCNQ, the TCNQ was first evaporated followed by evaporation of the complex salt and then decomposition of the complex salt occurred when the pellet was heated at a lower rate of increase than 4°C/sec. When the pellet was heated at a higher rate than 4°C/sec, the complex salt was only vaporized. For example, the quinolinium (TCNQ)$_2$ started to release a TCNQ at 74°C and then the complex salt at 110°C. A spectroscopical analysis identified the compositions of the deposits. A little difficulty was encountered however in vaporizing isopropylquinolinium (TCNQ)$_2$. When the pellet was heated at the lower rate to a temperature below 250°C only TCNQ was deposited, while it started to deposit the complex salt at a temperature above 250°C only when it was heated at the faster rate. Another difficulty with the isopropylquinolinium (TCNQ)$_2$ was that it decomposed at a temperature only 4° to 5°C higher than the evaporation temperature.

5. Quinolinium (TCNQ)$_2$, diamine TCNQ and ammonium TCNQ were evaporated at relatively lower temperatures. Measurements made on the surface cell of the organic semiconductors showed that the quinolinium (TCNQ)$_2$ was the most thermally stable compound of these since it showed irreciprocable resistivity at a temperature above 90°C, although the sandwich cell showed instability at a temperature above 100°C. Complex salts of TCNQ such as methyl-quinolinium (TCNQ)$_2$, isopropylquinolinium (TCNQ)$_2$ and fer-ricinium (TCNQ)$_2$ have a unique property of evaporating at a higher temperature than those referred to above, but slightly lower than the temperature of decomposition. The organic semiconductor thin film thus obtained was firmly bonded to the dielectric film with the result that the dielectric characteristic of the capacitor was greatly improved. Particularly, a capacitor using isopropylquinolinium (TCNQ)$_2$ showed a dielectric loss of 0.1% at 1 kHz and its thermal stability at temperatures below 140°C.

The present invention will be further described by way of the following Examples.

EXAMPLE 1

Figure 2:
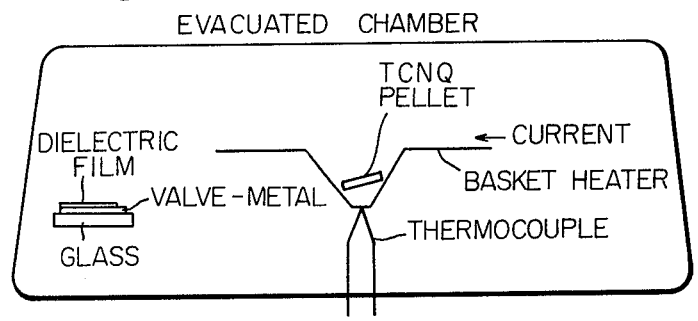
FIG. 2 is a schematic view of an evaporating chamber employed in the practice of the present invention for evaporating organic semiconductors in the form of a pellet.

This Example illustrates a method of producing a thin-film capacitor with reference to FIGS. 1 and 2 using a thin-film aluminum as a valve-metal. A thin film aluminum was anodized at 25 volts in a manner known in the art to form an oxide dielectric film thereon. A pellet of quinolinium (TCNQ)$_2$ was placed in a basket heater situated in an evacuated chamber and heated to 120°C at a rate of 5°C per second by the passage of current through the basket heater and maintained there for about 5 minutes to provide uniform heating of the pellet and then raised to 150°C at 5°C per second. The rate of temperature increase was measured by a thermocouple connected to the bottom of the basket heater. The pellet was heated at this temperature for 1 minute. The complex TCNQ salt was evaporated and deposited on the dielectric film of the thin-film aluminum located adjacent the heater to a thickness of about 3,000 A. In the next step, gold was evaporated onto the organic thin film to form an inactive metal film followed by evaporation of aluminum to serve as a terminal for the cathode. The thin-film capacitor made according to the above procedures showed the following characteristics:

| Capacitance<br>(pF/mm$^2$) | Dielectric Loss<br>(% tan δ at 1 kHz) | Leakage Current<br>(amp/mm$^2$ at 20V) |
|---|---|---|
| 2400 – 2500 | 5 – 10 | $1 \times 10^{-7}$ |

A test showed that breakdown occurred at 25 volts and the working voltage was 50% of the formation voltage if the leakage current is desired to be held below $10^{-8}$ A/mm$^2$.

EXAMPLE 2

This Example illustrates another method of producing a thin-film electrolytic capacitor using a thin-film tantalum as a valve metal. Quinolinium (TCNQ)$_2$ was prepared in the form of powder. The container of FIG. 3 was filled with the quinolinium powder which was poured into a tantalum boat pre-heated at 150°C. The powder was instantaneously vaporized and the complex TCNQ salt was deposited on a dielectric film positioned adjacent the tantalum boat. The evaporation was continued for 1 minute to deposit the complex salt to a thickness of about 3,000 A. Gold was vapor deposited on the film of TCNQ salt to produce a thin-film tantalum capacitor with the following characteristics:

| Capacitance<br>(pF/mm$^2$) | Dielectric Loss<br>(% tan δ at 1 kHz) | Leakage Current<br>(amp/mm$^2$ at 20 V) |
|---|---|---|
| 4000 – 4500 | 10 – 40 | $5 \times 10^{-7}$ |

As compared with Example 1, the leakage current is greater than with the aluminum thin film. This appears to be caused by its properties of less adhesiveness to the deposited organic film.

EXAMPLE 3

This is for the purpose of comparison between Example 1 and a capacitor produced according to this Example wherein gold evaporation was omitted. As compared with Example 1, the capacitor produced with no gold evaporation showed that (1) capacitance value had reduced to about half of Example 1, (2) the dielectric loss had increased to 2 to 10 times, and (3) the leakage current had reduced to about 1/10. Since the resistivity of the organic semiconductor used in the Examples 1 and 2 were less than 200 ohm-cm, the dielectric loss due to the resistivity will be held at a value below 0.01% at 1 kHz even when the organic film is formed up to 10 μ thick to give a capacitance of 10,000 pF/mm$^2$. Therefore, it follows that the dielectric loss of the capacitor largely depends on the adhesiveness of the organic film both to the oxide dielectric film and to the counter electrode.

EXAMPLE 4

This Example illustrates source temperature at which the complex salt of TCNQ-containing compounds is evaporated. Organic compounds were prepared in the form of powder and heated in the same manner as described in Example 2. The following list of temperatures at which complex TCNQ salt is evaporated is obtained:

| TCNQ-containing Organic Semiconductors | Source Temperature(°C) |
|---|---|
| Diamine-TCNQ compounds | |
| p-phenylenediamine TCNQ | 110 |
| N,N'-dimethyl-p-phenylenediamine TCNQ | 150 |
| N, N', N', N'-tetramethyl-p-phenylenediamine-TCNQ | 190 |
| Tertiary, Quarternary amine-TCNQ compounds | |
| Tetrapropylammonium TCNQ | 110 |
| Ammonium TCNQ | 90 |
| Triethylammonium TCNQ | 100 |
| Tetrabuthylammonium (TCNQ)$_2$ | 120 |
| Quinoline-TCNQ compounds | |
| Quinolinium (TCNQ)$_2$ | 150 |
| Isopropylquinolinium (TCNQ)$_2$ | 250 |
| Methylquinolinium (TCNQ)$_2$ | 245 |
| Pyridine-TCNQ compounds | |
| Pyridinium (TCNQ)$_2$ | 200 |
| Methylpyridinium (TCNQ)$_2$ | 260 |
| Ferricinium (TCNQ)$_2$ | 200 |

EXAMPLE 5

This Example illustrates a method of producing a thin film capacitor wherein the valve-metal is surface treated to provide porosity.

A thin film of aluminium was pre-anodized within a solution of 0.5% oxalic acid at current densities ranging from 0.1 to 1 mA/cm$^2$ for a period of about 5 to 25 minutes. The pre-anodization followed by anodization in the conventional manner in an electrolyte of boric acid at the formation voltage of 25 volts. Capacitors were produced according to the procedures in Example 1 using the pre-anodized aluminium anode. The following Table shows the corresponding characteristics of the capacitor made according to the above procedures:

| Pre-anodization | Pre-anodized Film Thickness | Capacitance | Dielectric Loss | Leakage Current at |
|---|---|---|---|---|
| (mA/cm² × min.) | ($\mu$) | (pF/mm²) | (%tan $\delta$) | 10V (A) |
| 1 . 5 | 82 | 800 | 1–5 | $10^{-9}$ |
| 0.5 . 5 | 51 | 1200 | 0.5–1 | $10^{-9}$ |
| 0.2 . 12.5 | 70 | 2000 | 0.2–0.9 | $10^{-9}$ |
| 0.1 . 25 | 60 | 2400 | 1–5 | $10^{-8}$ |
| 0 . 0 | 0 | 2500 | 5–10 | $10^{-8}$ |

EXAMPLE 6

Figure 3:
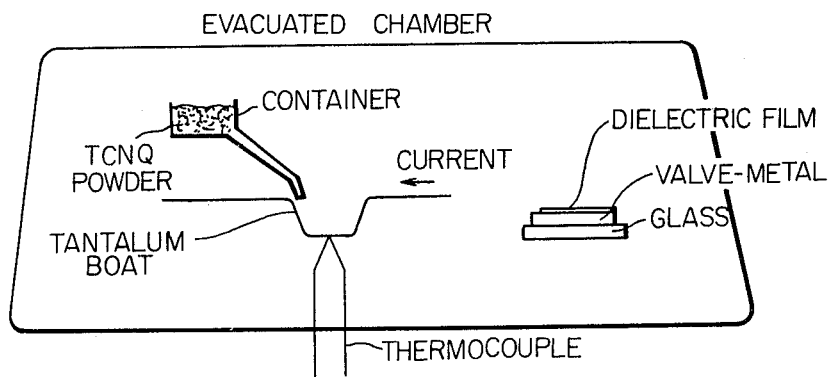
FIG. 3 is a schematic view of an evaporating chamber employed in the practice of the present invention for evaporating organic semiconductors in the form of particles.

The following is an illustration of the use of $Cu^{++}(TCNQ)_2^-$ as the electrolyte with the use of pre-anodized aluminum valve-metal. The valve-metal was preanodized in a 0.5% oxalic acid solution at a current density of 0.3 mA/cm² for 7 minutes and then anodized at 10 volts within a boric acid solution to form an oxidized dielectric film. In FIG. 3 a container was filled with the powder of $Cu^{++}(TCNQ)_2^-$ which was introduced into the tantalum boat which had been preheated at 240°C. The organic semiconductor was rapidly heated as in Example 2 and vaporized releasing the simple salt of the $Cu^{++}(TCNQ)_2^-$, which deposited on the dielectric film. Gold was evaporated onto the organic semiconductor film and followed successively by the evaporation of aluminum. A capacitor made according to the above procedure has a capacitance value of 5000 pF/mm².

EXAMPLE 7

The procedures of Example 6 were repeated except that tantalum was used as the valve-metal in place of aluminum. The procedures resulted in a capacitor with a capacity of 9000 pF/mm². However, the dielectric loss imposed limitation on the useful frequency up to 50 kHz.

EXAMPLE 8

This Example illustrates the effect of etching the surface of aluminum valve-metal on the overall capacity of the capacitor using quinolinium-$TCNQ_2$ electrolyte. The aluminum thin film was etched in a hydrochloric acid containing solution to increase its surface area to a ratio of 1 : 15 prior to the pre-anodization as described in Example 6. These procedures resulted in a capacitor with a capacity of 1950pF/mm². The upper frequency limit was 1 MHz.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A thin-film solid electrolytic capacitor comprising, a valve metal, an oxide dielectric film formed thereon, a vapor deposited film of a TCNQ salt formed on said dielectric film and a cathode, said TCNQ salt film having a thickness of at most about 10 $\mu$.

2. A thin-film solid electrolytic capacitor according to claim 1, wherein said capacitor further comprises a film of an inactive metal deposited on said film of TCNQ salt.

3. A thin-film solid electrolytic capacitor according to claim 1, wherein said TCNQ salt is selected from the group consisting of a diamine-TCNQ compound, tertiary and quarternary amine-TCNQ compounds, a quinoline TCNQ compound, and a pyridine-TCNQ compound.

4. A thin-film solid electrolytic capacitor according to claim 2, wherein said inactive metal is selected from the group consisting of gold and silver.

5. A thin-film solid electrolyte capacitor as claimed in claim 1, wherein said oxide dielectric film comprises a porous oxide dielectric film having a rugged surface and formed on said valve-metal, and a barrier oxide dielectric film formed on said porous oxide film to cover at least a portion of said rugged surface.

6. A thin-film solid electrolyte capacitor as claimed in claim 5, wherein said valve-metal has an etched and rough surface.

* * * * *